(12) United States Patent
Tanner

(10) Patent No.: US 7,426,870 B2
(45) Date of Patent: Sep. 23, 2008

(54) TORSIONAL FIXING DEVICE, ESPECIALLY FOR THE HOUSING OF A MEASURING TRANSDUCER

(75) Inventor: Jürgen Tanner, Kandern (DE)

(73) Assignee: Endress + Hauser GmbH + Co. KG, Maulburg (DE)

( * ) Notice: Subject to any disclaimer, the term of this patent is extended or adjusted under 35 U.S.C. 154(b) by 105 days.

(21) Appl. No.: 10/521,459

(22) PCT Filed: Jul. 14, 2003

(86) PCT No.: PCT/EP03/07616

§ 371 (c)(1),
(2), (4) Date: Sep. 21, 2005

(87) PCT Pub. No.: WO2004/008820

PCT Pub. Date: Jan. 22, 2004

(65) Prior Publication Data

US 2006/0121301 A1    Jun. 8, 2006

(30) Foreign Application Priority Data

Jul. 15, 2002    (DE) ................................ 102 32 088

(51) Int. Cl.
*F16B 31/02*    (2006.01)

(52) U.S. Cl. ........................................................ 73/761
(58) Field of Classification Search .................... 73/761
See application file for complete search history.

(56) References Cited

U.S. PATENT DOCUMENTS

| | | | | |
|---|---|---|---|---|
| 4,041,379 A * | 8/1977 | Karlsson | ...................... | 324/260 |
| 4,500,300 A * | 2/1985 | Wolf et al. | ..................... | 464/83 |
| 5,088,339 A * | 2/1992 | Lochmoeller | .............. | 74/89.37 |
| 5,490,751 A * | 2/1996 | Courgeon | ................... | 441/368 |
| 5,501,377 A * | 3/1996 | Dubach | ....................... | 222/521 |
| 5,737,963 A * | 4/1998 | Eckert et al. | ................... | 73/290 |
| 5,810,828 A * | 9/1998 | Lightman et al. | ............. | 606/80 |
| 6,557,431 B2 * | 5/2003 | Pawlak | ..................... | 74/424.75 |

* cited by examiner

*Primary Examiner*—Edward Lefkowitz
*Assistant Examiner*—Octavia Davis
(74) *Attorney, Agent, or Firm*—Bacon & Thomas, PLLC

(57) ABSTRACT

For limiting twist of a measurement transmitter housing relative to a sensor element, onto which the measurement transmitter housing is screwed, axial barriers are provided, so that the axial position of the measurement transmitter housing relative to the sensor element is limited to a range between two extreme positions defined by the axial barriers. The axial barriers are preferably formed by a ring, which engages both an annular groove in an outer, lateral surface of the sensor element and an annular groove in a cylindrical duct of the transmitter housing.

12 Claims, 3 Drawing Sheets

TORSIONAL FIXING DEVICE, ESPECIALLY FOR THE HOUSING OF A MEASURING TRANSDUCER

FIELD OF THE INVENTION

The present invention concerns twist limiting features, such as can be used, for example, for housings of electrical devices, for example measurement transmitters.

BACKGROUND OF THE INVENTION

Such housings are frequently embodied in two parts, with a first part of the housing being twistable with respect to a second part through a predetermined angular range, in order to rotate, for example, display or operating elements, which are arranged on the first housing part, into a desired orientation. Since cable frequently extends between the first and second housing parts, the angular range must be limited, in order to prevent a damaging of the cable or components connected therewith.

Known differential pressure transmitters, available under the name "Deltabar", exhibit a twist limiting feature which may be described as follows. The first housing part has a tubular, first connecting flange with an internal thread, which is screwed onto an external thread of a complementary, second connecting flange of the second housing part. From the cylindrical, outer lateral surface of the second connecting flange, a stop lug extends radially outwards, in a section which is axially separated from the first connecting flange. Following the screwing of the first connecting flange onto the second connecting flange, a metal tongue is mounted on the outer, lateral surface of the first connecting flange. The metal tongue extends in the axial direction across the first connecting flange and beyond, and overlaps the stop lug in the axial direction. Twist of the second connecting flange with respect to the first connecting flange is, as a result, limited in both directions by the hitting of the metal tongue on the stop lug. Although this described, twist limiting feature is reliable, nevertheless its manufacture and mounting are involved.

The described problem concerns not only pressure sensors, but, quite generally, all sensors of the technology of industrial process measurements, especially flow rate sensors, viscosity sensors, fill level sensors, pH-sensors and other potentiometric sensors, temperature sensors, moisture and humidity sensors, gas sensors and turbidity sensors.

SUMMARY OF THE INVENTION

An object of the present invention, therefore, is to provide a device having a twist limiting feature for parts of the device which screw together, especially housing parts.

The object is achieved according to the invention by the device comprising: a housing element with a first thread; and a second element with a second thread, which is complementary to the first thread and is engaged therewith; the housing element and the second element are twistable relative to one another about the axis of the two threads, the twisting causes a change of the axial position of one with respect to the other due to the pitch of the threads, wherein: a twist limiting feature, limits the twistability of the housing element relative to the second element to an angular range, and twist limiting feature comprises two axial barriers, so that the axial position of the housing element relative to the second element is limited to a range between two extreme positions determined by the axial barriers.

The device of the invention includes a housing element, which has a first thread; and a second element, which has a second thread complementary to the first thread and engaged therewith. The housing element and the second element are twistable with respect to one another about the axis of the two threads, and the twist results in a change of their relative axial positions, due to the pitch of the threads. The device additionally exhibits a twist limiting feature, which limits the twisting of the housing element relative to the second element to an angular range. The twist limiting feature includes two axial barriers, whereby the axial position of the housing element relative to the second element is limited to a range between two extreme positions defined by the axial barriers.

Preferably, the axial barriers are so arranged that the difference between the extreme positions corresponds to the axial shift caused by a twisting of the housing element by the maximum allowable angle of twist relative to the second element, at the given pitch of the thread.

An axial barrier preferably includes, on at least one of the elements, i.e. the housing element or the second element, a preferably rotationally symmetric, axial stop surface, which serves as a barrier for a stop, respectively coupling, member coupled with the, in each case, other element in such a way that the freedom of movement of the stop member is limited relative to the other element, at least in the axial direction. The limiting of the freedom of movement can likewise be assured by axial stop surfaces on the other element, or the stop member can be connected fixedly with the other element.

Axial stop surfaces can be formed especially by radial steps between two coaxial, cylindrical sections. For this purpose, a lateral surface of the housing element, respectively a lateral surface of the second element, can have such cylindrical sections. Especially, the lateral surface of a cylindrical section of the housing element or of the second element can have an annularly running groove, which extends radially inwards and is limited in the axial direction by first and second radial steps, with the first and the second radial steps each serving as an axial stop surface for one of the two axial barriers.

Likewise, the housing element or the second element can include at least one duct with cylindrical sections of different radii, whose axis of rotation is aligned with the axis of the threads, with there being formed between at least two sections of different radii a radial step, which serves as an axial stop surface for an axial barrier of the twist limiting feature. Especially, there can be provided in the lateral surface of a cylindrical duct of the housing element or the second element an annular groove, which extends radially outwards and is bounded in the axial direction by first and second radial steps, with the first and second radial steps serving each as an axial stop surface for one of the two axial barriers.

To serve as the stop member, a pin or a protrusion can be provided, which is fixedly connected with the, in each case, other element, i.e. the element which does not have the groove, and protrudes radially inwards, or radially outwards, as the case may be, into the groove.

Currently especially preferred is a form of embodiment, in which a stop ring is engaged with a first, radially outwardly extending groove and with a second, radially inwardly extending groove, with the first nut being located in the lateral surface of a cylindrical duct in the housing element, or in the second element, as the case may be, and with the other element having a cylindrical section, in whose lateral surface the second groove is located, with the cylindrical section being located in the cylindrical duct in such a way that the first groove overlaps at least partially with second groove in the axial direction.

The stop ring is, in an especially preferred form of embodiment, a spring ring, or an annular washer which is radially flexible.

The stop ring comprises, preferably, a softer material than the material in which the grooves are formed. For example, the housing element and the second element can feature, at least sectionally, a metal, especially steel, cast iron, or aluminum, while the stop ring preferably features a synthetic material, especially an elastomer or a thermoplastic material.

In a currently preferred form of embodiment, the screwed connection of the housing element with the second element, with interposition of the stop ring, is irreversible to the extent that release of the screwed connection is not possible without a destruction of the stop ring. The stop ring can, consequently, also serve the function of a seal, whose integrity can, for example, be a prerequisite for performances under guarantee.

The axial dimension of the stop ring, i.e. especially its material thickness, is preferably so matched to the width of the first and second grooves that the sum of the widths of the first and second grooves, minus twice the axial dimension corresponds to the axial shift resulting at the given pitch of the thread from a rotation of the housing element relative to the second element by the maximum allowable angle of twist.

The maximum angle of twist should not be more than 720°, thus two full rotations. In a currently preferred form of embodiment, the maximum angle of twist is 360°. With this, the housing element and the second element can assume any orientation with respect to one another. This is especially of interest for forms of embodiment where the housing element has a display field and/or operating elements, which are to be oriented optimally for the operator.

For applications in process measurement technology, the housing element comprises, preferably, a measurement transmitter housing, with the second element preferably exhibiting a connection adapter, or a sensor housing, for connection to the measurement transmitter housing.

The invention will now be explained in greater detail on the basis of an example of an embodiment illustrated in the drawings, the figures of which show as follows:

DESCRIPTION OF THE PREFERRED EMBODIMENT

Figure 1:
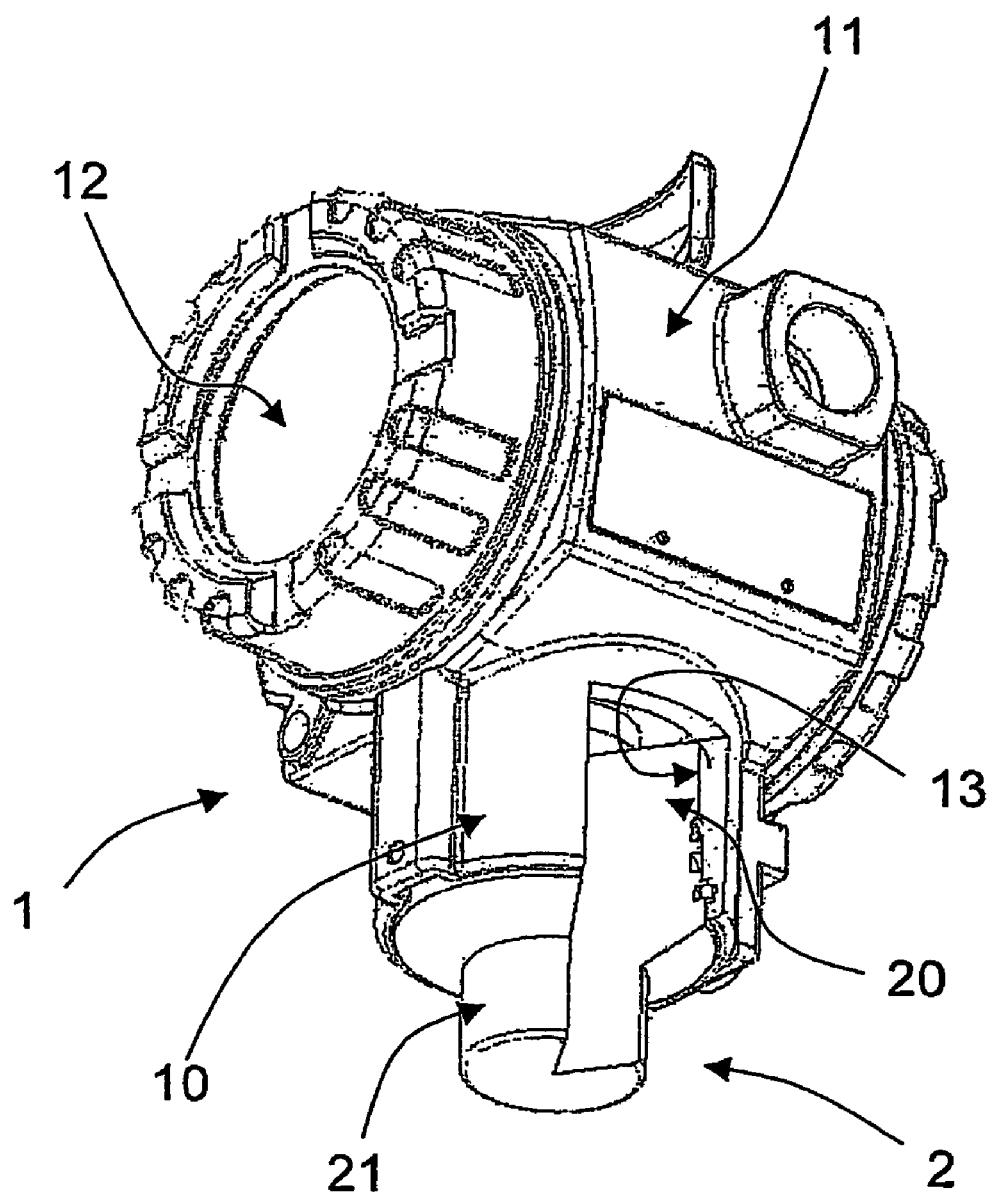
FIG. 1 is a perspective view of a device of the invention, including a measurement transmitter and a sensor.

The measurement transmitter housing 1 shown in FIG. 1 has a drum-shaped housing section 11, in which usually electronic components, especially components for data communication, are arranged. In the lateral surface of the drum-shaped housing section 11, an duct is provided, which is defined by an essentially tube-shaped connection flange 10, into which is screwed a sensor element 2. This sensor element 2 is portrayed in FIG. 1 as a solid block, since the internal structure of the sensor element 2 is not of concern for the present invention. The sensor element 2 exhibits, at least sectionally, a cylindrical transmitter connection 20, which is screwed into the duct 20 of the tubular connection flange 10. For this purpose, there is provided on the outer lateral surface of the transmitter connection 20 a threaded section, which engages a complementary internal thread 13 on the inner wall of the connection flange 10. The sensor element 2 has additionally in this example of an embodiment a cylindrical process connection plug 21, whose lateral surface is provided with a thread, with which the sensor element can be secured, for example, to a suitable container or opening in a line. It is apparent for those skilled in the art that suitable seals are to be provided, but this does not need to be detailed for the present invention.

The measurement transmitter 1 has on an end face of the drum-shaped housing section 11 a display 12. In order to be able to turn this display into any orientation, the measurement transmitter housing must be twistable relative to the sensor element 2. The twistablity is, however, limited to a small, angular range, in order, for example, to avoid damaging cables extending from the sensor element 2 into the transmitter housing 1. This is assured by the twist limiting feature of the invention, which employs two, axial barriers to limit the axial position of the transmitter housing 1 relative to the sensor element to a range covered due to the pitch of the internal thread 13 when the transmitter housing 1 is turned about the thread axis by the maximum allowable angle of rotation. Details concerning the twist limiting feature will now be explained on the basis of FIGS. 2 and 3.

Figure 2:
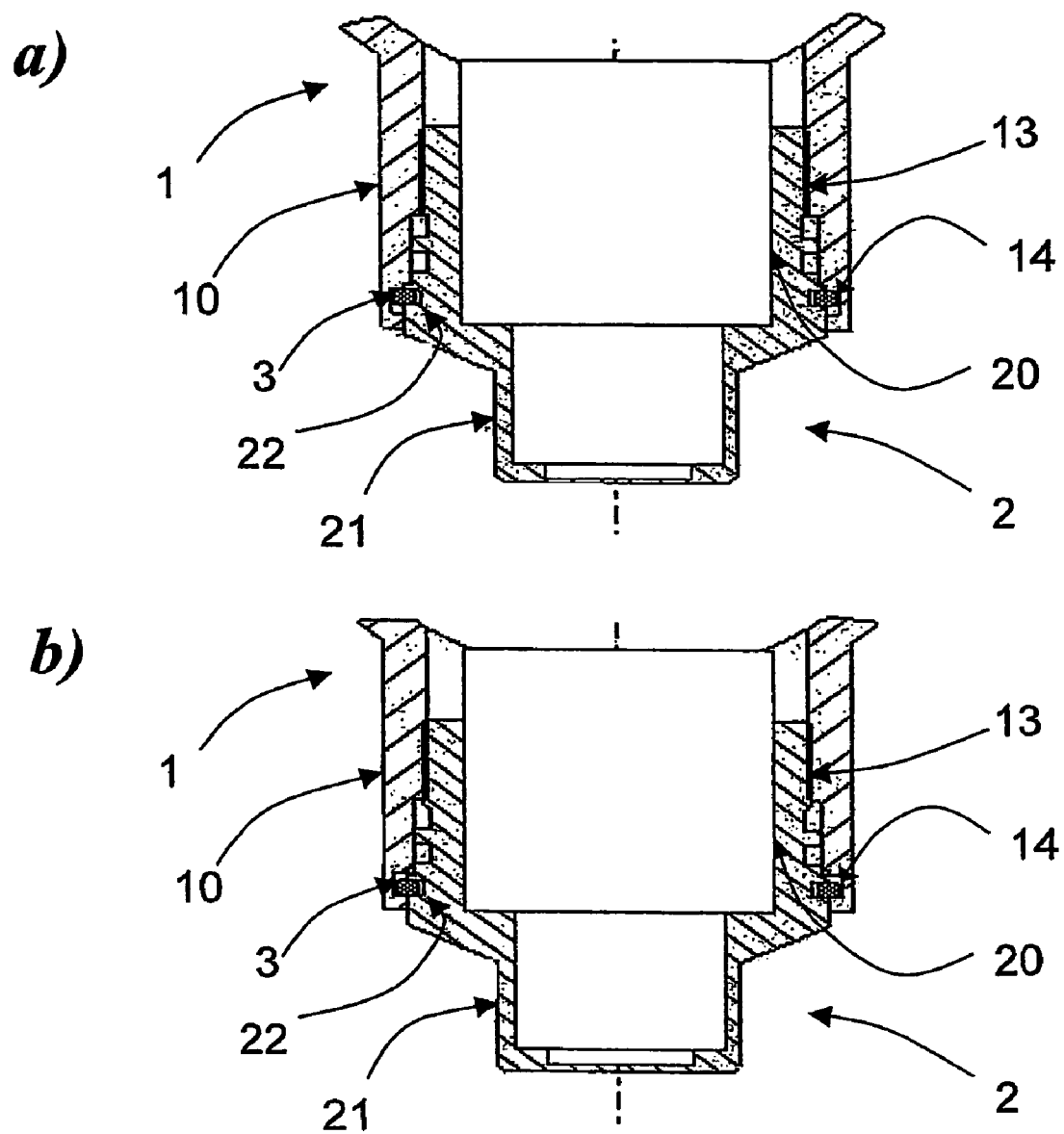
FIG. 2 is a detail view of longitudinal sections through the device of the invention, showing the connection between the measurement transmitter housing and the sensor housing.

FIG. 2 shows two views of a longitudinal section through the tube-shaped connection flange 10 of the transmitter housing 1, into which the transmitter connection 20 of the sensor element 2 has been screwed. Each view shows transmitter connection 20 in a different axial position.

The tubular connection flange 10 has in its inner wall a first annular groove 14 extending radially outwards. The first annular groove 14 is bounded by two radial steps, whose axial separation from one another defines the breadth B1 of the first annular groove 14. In similar manner, the transmitter connector 20 has on its outer lateral surface an annular groove 22, which extends radially inwards. The second annular groove 22 is likewise bounded by two radial steps, whose axial separation from one another defines the second breadth B2 of the second annular groove 22.

The radial steps, which bound the first and second annular grooves, serve as axial stop surfaces for a stop ring 3. The stop ring 3 engages both the first annular groove 14 and the second annular groove 22, i.e. the outer radius $R_o$ of the stop ring 3 is greater than the radius of the inner wall of the connection flange 10 in the section from which the first annular groove extends radially outwards, and the inner radius $R_i$ of the stop ring 3 is smaller than the radius of the outer lateral surface of the connection flange 20 in the section from which the second annular groove 22 extends radially inwards.

The stop ring 3 has an upper face 30 and a lower face 31, which are preferably at least sectionally parallel to one another. The faces 30, 31 form together with the axial stop surfaces, axial barriers for limiting the movement of the transmitter housing 1 relative to the sensor element 2. The effect of the axial barriers is described in the following. The concepts "above", respectively "below", designate in this connection the directions toward, respectively away from, the process connection.

The portion a) of FIG. 2 shows the situation, in which the transmitter housing 1 has reached the lower extreme position relative to the sensor element 2. In this situation, the inner region of the lower face 31 hits against the lower axial stop surface, which borders the second annular groove 22, and the outer region of the upper face 30 hits against the upper, axial stop surface, which bounds the first annular groove 14.

The portion b) of FIG. 2 shows the situation, in which the transmitter housing 1 has reached the upper extreme position relative to the sensor element 2. In this situation, the outer region of the lower face 31 hits against the lower axial stop surface, which bounds the first annular groove 14, and the inner region of the upper face 30 hits against the upper axial stop surface, which bounds the second annular groove 22.

The stop ring 3 exhibits in the region of the first annular groove a first axial thickness T1 and in the region of the second annular groove a second axial thickness T2. In the currently preferred form of embodiment, the first axial thickness T1 is equal to the second axial thickness T2 (T1=T2=T). Fundamentally, these can, however, be different from one another. The first axial thickness T1 and the second axial thickness T2 of the stop ring, as well as the first breadth B1 of the first annular groove and the second breadth B2 of the second annular groove are so related to one another that the following holds:

$$(B1-T1)+(B2-T2)=S(\phi max),$$

where $S(\phi max)$ is the axial shift of the thread 13, which accompanies a twisting of the transmitter housing 1 by the maximum angle of twist $\phi max$. For T1=T2=T, B1+B2−2T=S($\phi max$).

The maximum angle of twist $\phi max$ is about 360° in a currently preferred form of embodiment. In such case, the transmitter housing 1 can assume every possible orientation relative to the sensor element 2, and connecting cables extending between the sensor element 2 and the transmitter housing 1 are subjected to, at most, one revolution.

Figure 3:
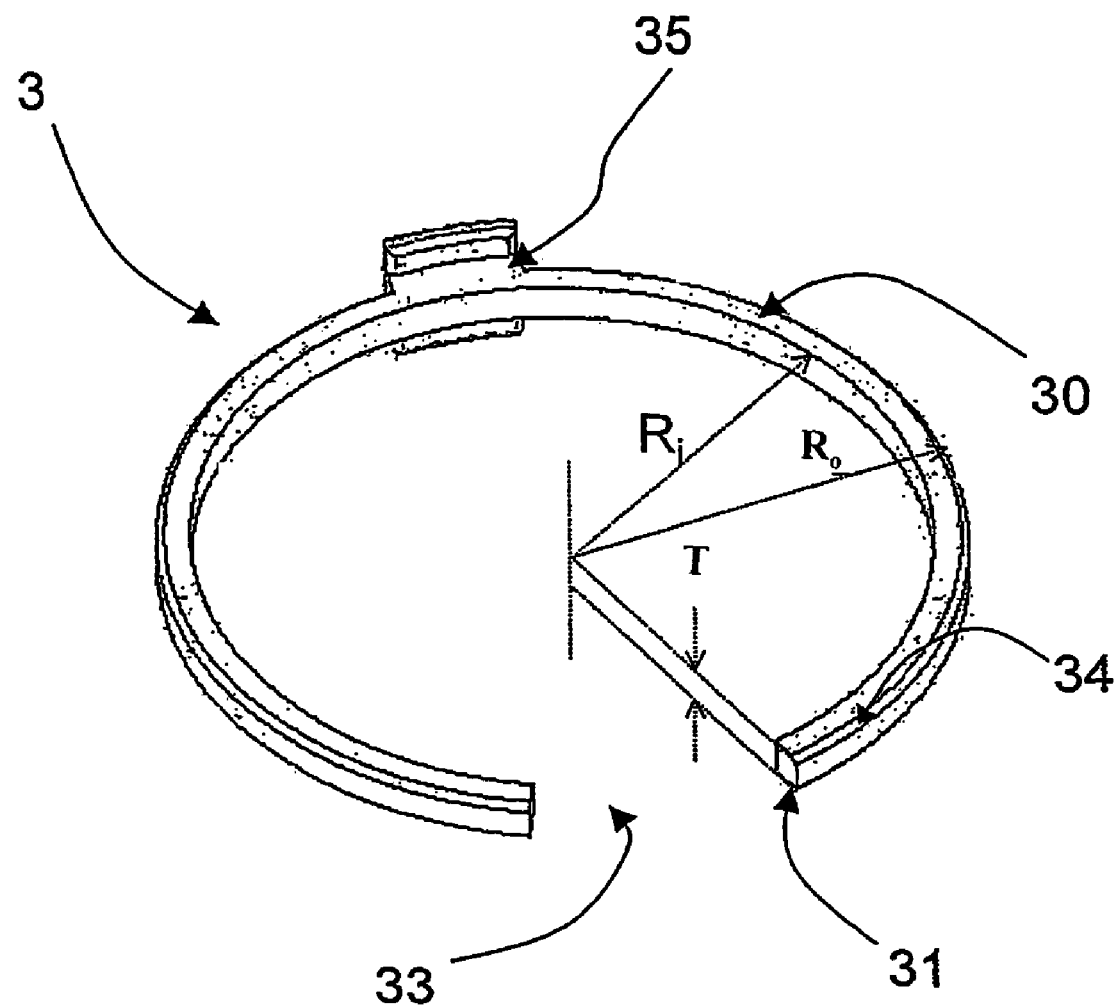
FIG. 3 is a stop ring of a device of the invention.

The stop ring 3 shown in FIG. 3 has an inclined surface 34 on the outer edge of its upper face 30. Additionally, the ring is interrupted by a slit 33, for the purpose of facilitating the mounting of the transmitter housing on the sensor element 2. The stop ring of this form of embodiment is preferably made of an elastic material. For the mounting, first the elastic stop ring 3 is installed into the second annular groove 22. Then, the transmitter housing 1 is screwed onto the sensor element 2, with the stop ring 3 being pressed by the inner wall of the connection flange 10 completely into the second annular groove 22, until the first annular groove 14 overlaps the second annular groove sufficiently that the stop ring 3 can spring back and engage the first annular groove 14, whereby the twist limiting feature is completed.

The projection 35 shown in FIG. 3 is an optional feature for fixing rotation of the stop ring relative to the transmitter housing 1. This feature is, however, not essential to the invention. In forms of embodiment containing this feature, a groove in the axial direction is provided in the inner wall of the connection flange 10, for accommodating the projection with sufficient axial play.

Another form of embodiment is distinguished from what has been described above in that no stop ring and no first groove are provided. Instead of these, at least one stop body, for example a stop pin is fixedly connected with the connection flange 20 and extends into the second annular groove. In this case, the difference between the second breadth and the axial dimension of the stop body determines the thread shift in the case of twist of the transmitter body by the maximum angle.

The stop pin can, for example, be provided in the form of a bolt, which is screwed into a radial, traversing, threaded bore in the lateral surface of the connection flange 10, when the threaded bore overlaps the second annular groove. Optionally, a clamping screw can be provided, which fixes a preferred orientation of the transmitter housing relative to the sensor element. A radial, threaded bore for receiving the clamping screw can be provided especially in the form of a coaxial, threaded bore through the stop pin.

The invention claimed is:

1. A device for a measurement transmitter housing, comprising:
   a housing element with a first thread; and
   a second element with a second thread, which is complementary to the first thread and is engaged therewith; said housing element and said second element are twistable relative to one another about the axis of the two threads, the twisting causes a change of the axial position of one of said housing element and said second element with respect to the other due to the pitch of the threads, wherein:
   a twist limiting feature, limits the twistability of said housing element relative to said second element about the axis of the two threads to an angular range, and
   said twist limiting feature comprises two axial barriers, so that the axial position of said housing element relative to said second element is limited to a range between two extreme positions determined by said axial barriers.

2. The device as claimed in claim 1, wherein:
   said axial barriers are so arranged, that the difference between the extreme positions corresponds to the axial shift caused, for given thread pitch, by a twisting of said housing element relative to said second element by the maximum allowable angle of twist.

3. The device as claimed in claim 1, wherein:
   one of said housing element and, said second element includes at least two cylindrical sections of differing radii, whose axis of rotation is aligned with the axis of the threads, and
   between the at least two sections of differing radii, a radial step is formed, which serves as an axial stop surface for an axial barrier of said twist limiting feature.

4. The device as claimed in claim 3, wherein:
   one of said housing element and said second element includes a cylindrical section, whose lateral surface includes an inwardly extending annularly running groove, and is bounded in the axial direction by first and second radial steps, and
   said first and second radial steps each serve for one of said two axial barriers.

5. The device as claimed in claim 1, wherein:
   one of said housing element and said second element includes at least one duct with cylindrical sections of differing radii, whose axis of rotation is aligned with the axis of the threads, and
   between the at least two sections of differing radii, a radial step is formed, which serves as an axial stop surface for an axial barrier of said twist limiting feature.

6. The device as claimed in claim 4, wherein:
   one of said housing element and said second element includes a cylindrical duct, whose lateral surface exhibits an annularly running groove, which extends radially outwards and is bounded in the axial direction by a first and a second radial step, and
   said first and second radial steps each serve as an axial stop surface for one of said two axial barriers.

7. The device as claimed in claim 6, wherein:
   said twist limiting feature further comprises a coupling element, which is engaged both with said radially outwardly extending groove and with said radially inwardly extending groove.

8. The device as claimed in claim 7, wherein:
   said coupling element comprises an annular washer.

9. The device as claimed in claim 8, wherein:
   said annular washer is radially flexible.

10. The device as claimed in claim 1, wherein:
said second element comprises a sensor element.

11. The device as claimed in claim 1, wherein:
said housing element includes a measurement transmitter housing, and the sensor element an industrial process measurement sensor, especially a pressure sensor, flow rate sensor, viscosity sensor, fill level sensor, pH-sensor or other potentiometric sensor, temperature sensor, moisture or humidity sensor, gas sensor or turbidity sensor.

12. A device for a measurement transducer housing, comprising:

a housing element with a first thread; and a second element with a second thread, which is complementary to the first thread and is engaged therewith; said housing element and said second element are twistable relative to one another about the axis of the two threads, the twisting causes a change of the axial position of one of said housing element and said second element with respect to the other due to the pitch of the threads, wherein:

a twist limiting feature, limits the twistability of said housing element relative to said second element about the axis of the two threads to an angular range;

said twist limiting feature comprises two axial barriers, so that the axial position of said housing element relative to said second element is limited to a range between two extreme positions determined by said axial barriers;

one of said housing element and, said second element includes at least two cylindrical sections of differing radii, whose axis of rotation is aligned with the axis of the threads;

between the at least two sections of differing radii, a radial step is formed, which serves as an axial stop surface for an axial barrier of said twist limiting feature;

one of said housing element and said second element includes a cylindrical section, whose lateral surface includes an inwardly extending annularly running groove, and is bounded in the axial direction by first and second radial steps;

said first and second radial steps each serve for one of said two axial barriers;

one of said housing element and said second element includes a cylindrical duct, whose lateral surface exhibits an annularly running groove, which extends radially outwards and is bounded in the axial direction by a first and a second radial step;

said first and second radial steps each serve as an axial stop surface for one of said two axial barriers;

said twist limiting feature further comprises a coupling element, which is engaged both with said radially outwardly extending groove and with said radially inwardly extending groove;

said radially inwardly extending groove has a first breadth in the axial direction, and said radially outwardly extending groove has a second breadth in the axial direction; and the axial thickness of said coupling element is selected such that the sum of the first breadth and the second breadth, minus twice the axial thickness, corresponds to the axial shift caused at the given pitch of the threads by a twisting of said housing element relative to said second element by the maximum allowable twist angle.

* * * * *